(12) United States Patent
Kurota

(10) Patent No.: US 12,267,619 B2
(45) Date of Patent: Apr. 1, 2025

(54) DISPLAY SYSTEM AND DISPLAY METHOD

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/498,226

(22) Filed: Oct. 31, 2023

(65) Prior Publication Data

US 2024/0146869 A1 May 2, 2024

(30) Foreign Application Priority Data

Oct. 31, 2022 (JP) .................................. 2022-174592

(51) Int. Cl.
| | |
|---|---|
| *H04N 7/01* | (2006.01) |
| *H04N 5/268* | (2006.01) |
| *H04N 7/015* | (2006.01) |
| *H04N 9/31* | (2006.01) |

(52) U.S. Cl.
CPC ............. *H04N 7/015* (2013.01); *H04N 5/268* (2013.01); *H04N 7/0117* (2013.01); *H04N 9/3147* (2013.01); *H04N 9/3188* (2013.01)

(58) Field of Classification Search
CPC ........ H04N 7/01; H04N 7/015; H04N 7/0117; H04N 5/268; H04N 9/31; H04N 9/3147; H04N 9/3188; G09G 2370/12; G09G 2370/20; G09G 3/001

USPC ............................. 348/744, 441; 345/1.1, 1.3
See application file for complete search history.

(56) References Cited

U.S. PATENT DOCUMENTS

| | | | |
|---|---|---|---|
| 8,885,099 B2 * | 11/2014 | Balram | H04N 21/440263 348/441 |
| 2002/0113907 A1 | 8/2002 | Endo et al. | |
| 2015/0181157 A1 * | 6/2015 | Kuo | H04N 21/4363 348/441 |

FOREIGN PATENT DOCUMENTS

| | | |
|---|---|---|
| JP | 2002-006817 A | 1/2002 |
| JP | 2009-100219 A | 5/2009 |

* cited by examiner

*Primary Examiner* — Sherrie Hsia
(74) *Attorney, Agent, or Firm* — Dority & Manning, P.A.

(57) ABSTRACT

A display system includes a plurality of display devices configured to display a display image, a computer configured to supply, to the plurality of display devices, information indicating the display image generated based on a first video signal conforming to a first communication standard, and a communication device configured to execute transmitting, to a video supply device on an outside, image information indicating resolution of a display region where the plurality of display devices display the display image, receiving, from the video supply device, a second video signal conforming to a second communication standard different from the first communication standard, and converting the second video signal into the first video signal and transmitting the first video signal to the computer.

8 Claims, 2 Drawing Sheets

DISPLAY SYSTEM AND DISPLAY METHOD

The present application is based on, and claims priority from JP Application Serial Number 2022-174592, filed Oct. 31, 2022, the disclosure of which is hereby incorporated by reference herein in its entirety.

BACKGROUND

1. Technical Field

The present disclosure relates to a display system and a display method.

2. Related Art

JP-A-2009-100219 (Patent Literature 1) discloses a display capable of writing resolution and aspect information selected by a user in an EDID (Extended Display Identification Data) memory as EDID information.

Patent Literature 1 considers only a case in which one display and a host PC (Personal Computer) that supplies an image are connected in a one-to-one relation. For example, in the case of a system that displays one content image using a plurality of display devices, it is sometimes desired to dispose, between a host PC and the plurality of display devices, a repeater that receives a content image and performs various kinds of processing on the content image. The method of related art does not refer to, when such a repeater is used, a configuration that can transmit information concerning a display region where a display image is displayed by the plurality of display devices.

SUMMARY

According to an aspect of the present disclosure, there is provided a display system including: a plurality of display devices configured to display a display image; a computer configured to supply, to the plurality of display devices, information indicating the display image generated based on a first video signal conforming to a first communication standard; and a communication device configured to execute: transmitting, to a video supply device on an outside, output image information indicating resolution of a display region where the plurality of display devices display the display image; receiving, from the video supply device, a second video signal conforming to a second communication standard different from the first communication standard; and converting the second video signal into the first video signal and transmitting the first video signal to the computer.

According to an aspect of the present disclosure, there is provided a display method including: a communication device transmitting, to a video supply device, output image information indicating resolution of a display region where a plurality of display devices display a display image; the communication device receiving a second video signal conforming to a second communication standard from the video supply device; and the communication device converting the second video signal into a first video signal conforming to a first communication standard different from the second communication standard and transmitting the first video signal to a computer; the computer supplying information indicating the display image based on the first video signal to the plurality of display devices; and the plurality of display devices displaying the display image in the display region.

DESCRIPTION OF EMBODIMENTS

An embodiment of the present disclosure is explained below with reference to the drawings. In the figures referred to below, scales of members are differentiated from actual scales in order to show members in recognizable sizes.

Figure 1:
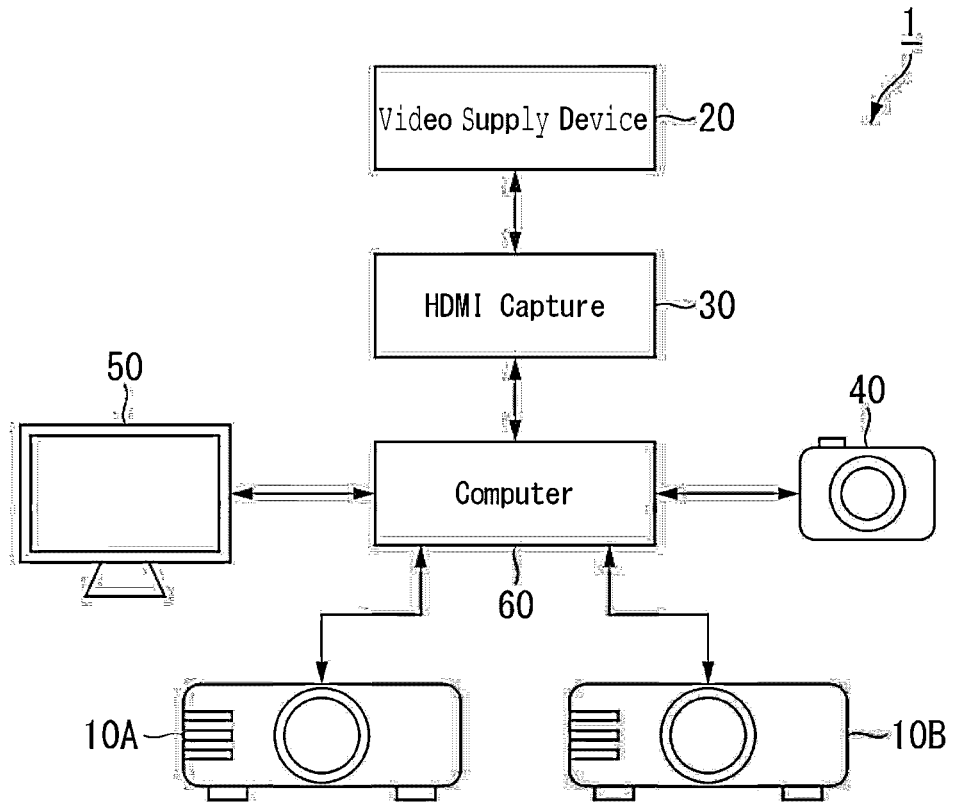
FIG. 1 is a diagram showing a schematic configuration of a projection system.

FIG. 1 is a diagram showing a schematic configuration of a projection system 1 in this embodiment. The projection system 1 is a multi-projection system that displays one image on a projection surface by tiling images projected onto the projection surface from a plurality of projectors. The projection surface may be a dedicated projection screen or may be a surface of an object such as a wall surface. The projection system 1 corresponds to "a display system".

As an example, the projection system 1 includes two projectors 10A and 10B as display devices. In the following explanation, the projector 10A is sometimes referred to as "first projector 10A" and the projector 10B is sometimes referred to as "second projector 10B". Further, the projection system 1 includes a video supply device 20, an HDMI (High-Definition Multimedia Interface: registered trademark) capture 30, a camera 40, an operation monitor 50, and a computer 60.

The first projector 10A and the second projector 10B respectively project images onto the projection surface based on a video signal output from the computer 60. In the following explanation, among regions on the projection surface, a region where an image is projected by the first projector 10A is sometimes referred to as "first projection region 100A". Among the regions on the projection surface, a region where an image is projected by the second projector 10B is sometimes referred to as "second projection region 100B".

Figure 2:
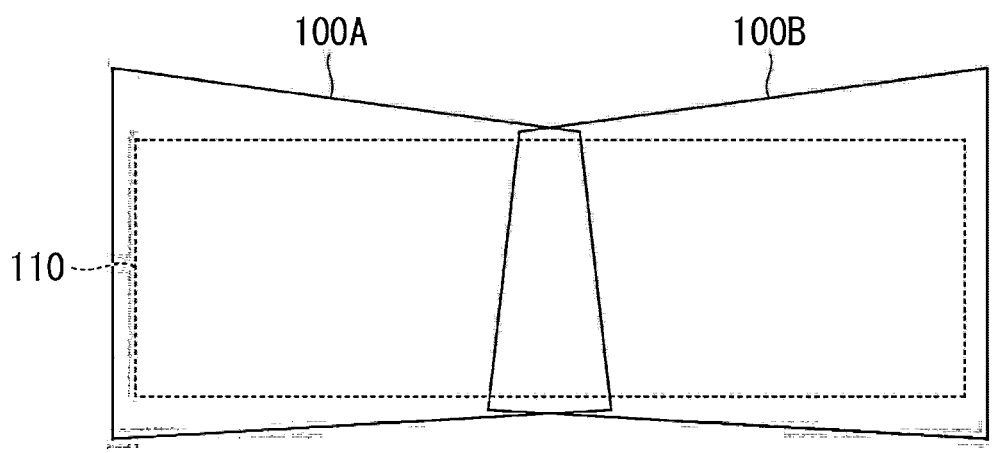
FIG. 2 is a diagram showing an example of a first projection region and a second projection region on a projection surface.

FIG. 2 is a diagram showing an example of the first projection region 100A and the second projection region 100B on the projection surface. As shown in FIG. 2, the first projector 10A and the second projector 10B are disposed side by side in the horizontal direction such that the first projection region 100A and the second projection region 100B partially overlap on the projection surface.

Referring back to FIG. 1, for example, the first projector 10A and the second projector 10B are respectively connected to the computer 60 via communication cables such as HDMI cables. The first projector 10A and the second projector 10B may be projectors capable of performing wireless communication with the computer 60.

The video supply device 20 supplies a video signal to the computer 60 via the HDMI capture 30. The video supply device 20 is, for example, a general-purpose PC such as a notebook PC, a DVD (Digital Versatile Disc) player, or a server connected to a network such as a Cloud network. The video supply device 20 may be a storage device such as a hard disk drive in which the video signal is stored.

The video supply device 20 is connected to the HDMI capture 30 via an HDMI cable. The HDMI cable is a communication cable conforming to an HDMI standard and includes a plurality of communication lines that perform a role specified by the HDMI standard. The HDMI cable includes at least a plurality of communication lines for a TMDS (Transition Minimized Differential Signaling) channel and a communication line for a DDC (Display Data Channel).

In the following explanation, the communication lines for the TMDS channel are sometimes referred to as "TMDS communication lines" and the communication line for the DDC is sometimes referred to as "DDC communication line". The TMDS communication lines perform a role of transmitting a video signal conforming to the HDMI standard. The DDC communication line performs a role of transmitting EDID. The EDID includes at least display information such as resolution to which the display devices are adaptable, an aspect ratio, a video type, chromaticity, and a gamma value. As explained above, the display devices in this embodiment are the first projector 10A and the second projector 10B.

The video supply device 20 receives EDID from the HDMI capture 30 via the DDC communication line. The video supply device 20 converts, based on the EDID received from the HDMI capture 30, an original video into a video having a video format optimum for the display devices and thereafter transmits a video signal conforming to the HDMI standard to the HDMI capture 30 via the TMDS communication lines. In the following explanation, the video signal transmitted from the video supply device 20 to the HDMI capture 30 is sometimes referred to as "HDMI video signal".

As explained above, the HDMI capture 30 is connected to the video supply device 20 via the HDMI cable. The HDMI capture 30 transmits the EDID to the video supply device 20 via the DDC communication line included in the HDMI cable. The HDMI capture 30 receives the HDMI video signal from the video supply device 20 via the TMDS communication lines included in the HDMI cable. The HDMI capture 30 is an example of the communication device.

The HDMI capture 30 is connected to the computer 60 via a USB (Universal Serial Bus) cable. The USB cable is a communication cable conforming to a USB standard. The HDMI capture 30 converts the HDMI video signal received from the video supply device 20 into a UVC (USB Video Class) video signal, which is a video signal conforming to the USB standard, and transmits the UVC video signal to the computer 60 via the USB cable. A detailed configuration of the HDMI capture 30 is explained below.

The UVC video signal transmitted from the HDMI capture 30 to the computer 60 corresponds to "a first video signal conforming to a first communication standard". The HDMI video signal transmitted from the video supply device 20 to the HDMI capture 30 corresponds to "a second video signal conforming to a second communication standard". That is, in this embodiment, the USB standard corresponds to the first communication standard and the HDMI standard corresponds to the second communication standard. In this way, the first communication standard and the second communication standard are communication standards different from each other.

The camera 40 is disposed in a position where the first projection region 100A and the second projection region 100B partially overlapping each other are fit within an angle of view. The camera 40 images a scene fit within the angle of view according to an imaging request signal received from the computer 60. In the following explanation, an image obtained by the camera 40 performing imaging is sometimes referred to as "captured image". The captured image includes images corresponding to the first projection region 100A and the second projection region 100B. The camera 40 outputs a captured image signal representing the captured image to the computer 60.

For example, the camera 40 is connected to the computer 60 via a communication cable such as a USB cable. The camera 40 may be a camera capable of performing wireless communication with the computer 60. Note that, since the camera 40 is a device necessary when calibration explained below is executed, the camera 40 may be disconnected from the computer 60 after the calibration ends.

The operation monitor 50 has a function of an input device that receives input operation of the user and a function of a display device that displays a GUI (Graphical User Interface) for operation. For example, the operation monitor 50 is a touch panel monitor. The operation monitor 50 outputs an electric signal generated by the operation monitor 50 being operated by the user to the computer 60 as an operation signal. The operation monitor 50 displays the GUI for operation based on an image signal output from the computer 60.

For example, the operation motor 50 is connected to the computer 60 via a communication cable such as a USB cable. Note that the operation monitor 50 may be a touch panel monitor capable of performing wireless communication with the computer 60. The operation monitor 50 is not limited to the touch panel monitor and may be a combination of a non-touch monitor and an input device including a mouse and a keyboard.

The computer 60 is a general-purpose PC such as a notebook PC. The computer 60 receives the UVC video signal transmitted from the HDMI capture 30, the captured image signal output from the camera 40, and the operation signal output from the operation monitor 50. The computer 60 outputs video signals respectively to the first projector 10A and the second projector 10B, outputs an imaging request signal to the camera 40, and outputs an image signal to the operation monitor 50. Note that, in the following explanation, the video signal output from the computer 60 to the first projector 10A is referred to as "first output video signal" and the video signal output from the computer 60 to the second projector 10B is referred to as "second output video signal".

The computer 60 performs calibration explained below based on the captured image signal input from the camera 40 to thereby acquire at least coordinates of the four vertexes of a screen area 110 and an all pixel correspondence map. The computer 60 generates a first output video signal and a second output video signal based on the UVC video signal and the all pixel correspondence map.

Calibration

As explained above, the first projector 10A and the second projector 10B are disposed side by side in the horizontal direction such that the first projection region 100A and the second projection region 100B partially overlap on the projection surface. When the projection surface is viewed from the front after the first projector 10A and the second projector 10B are disposed as explained above, as shown in FIG. 2, the first projection region 100A and the second projection region 100B respectively often do not become rectangular regions because of, for example, a three-dimensional shape of the projection surface and fluctuation in directions of the first projector 10A and the second projector 10B with respect to the projection surface.

In this case, in a state in which the camera 40 is disposed in the position where the first projection region 100A and the second projection region 100B partially overlapping each other are fit within the angle of view, the user performs, on the GUI for operation displayed on the operation monitor 50, operation for instructing a start of calibration. When the computer 60 detects the operation for instructing the start of the calibration based on an operation signal input from the operation monitor 50, the computer 60 starts the calibration.

After starting the calibration, while causing each of the first projector 10A and the second projector 10B to project a lattice pattern image, the computer 60 outputs an imaging request signal to the camera 40 to thereby request the camera 40 to image a scene within the angle of view. The camera 40 images the scene within the angle of view according to the request of the computer 60 and outputs a captured image signal representing a captured image including the lattice pattern image to the computer 60.

The computer 60 performs image processing for the captured image based on the captured image signal input from the camera 40 to thereby calculate a geometrical relation between the camera 40 and a panel. The panel is, for example, a liquid crystal panel mounted on each of the first projector 10A and the second projector 10B. In the following explanation, the panel of the first projector 10A is sometimes referred to as "first panel" and the panel of the second projector 10B is sometimes referred to as "second panel". The geometrical relation between the camera 40 and the panel is individually calculated for each of the first panel and the second panel.

As shown in FIG. 2, the computer 60 calculates, based on the geometrical relation between the camera 40 and the panel, as the screen area 110, a largest rectangular region fit within the inner side of both of the first projection region 100A and the second projection region 100B. The computer 60 calculates, based on coordinates of the four vertexes of the screen area 110 in a camera image coordinate system and the geometrical relation between the camera 40 and the panel, an all pixel correspondence map indicating a correspondence relation between coordinates of pixels of the panel in a panel image coordinate system and coordinates of pixels of an input image in an input image coordinate system. The screen area 110 is an example of the display region.

In the following explanation, the all pixel correspondence map calculated for the first panel is sometimes referred to as "first all pixel correspondence map" and the all pixel correspondence map calculated for the second panel is sometimes referred to as "second all pixel correspondence map". The input image is an image supplied from the video supply device 20 to the computer 60 via the HDMI capture 30 as an image, that is, video content represented by the UVC video signal.

The computer 60 executes the calibration explained above to thereby acquire at least the coordinates of the four vertexes of the screen area 110, the first all pixel correspondence map, and the second all pixel correspondence map. Note that the calibration explained above is processing generally known in a multi-projection system. Therefore, explanation concerning respective calculation methods for the geometrical relation between the camera 40 and the panel and the all pixel correspondence maps is omitted.

After the calibration ends, when receiving the UVC video signal from the HDMI capture 30, the computer 60 generates a first panel image by determining pixel values of pixels of the first panel based on pixel values of the pixels of the input image represented by the UVC video signal and the first all pixel correspondence map. The computer 60 generates a second panel image by determining pixel values of pixels of the second panel based on the pixel values of the pixels of the input image and the second all pixel correspondence map. The computer 60 outputs a first output video signal representing the first panel image to the first projector 10A and outputs a second output video signal representing the second panel image to the second projector 10B. The first output video signal and the second output video signal are examples of the information indicating the display image. The outputting the first output video signal representing the first panel image to the first projector 10A and outputting the second output video signal representing the second panel image to the second projector 10B is an example of the supplying the information indicating the display image to the plurality of display devices.

Consequently, a rectangular first display image corresponding to the first panel image is projected onto the projection surface from the first projector 10A and a rectangular second display image corresponding to the second panel image is projected onto the projection surface from the second projector 10B. As a result, the first display image and the second display image are tiled in the screen area 110 on the projection surface, whereby one rectangular display image corresponding to the input image is displayed over the entire screen area 110.

As explained above, if the all pixel correspondence map is present, the first display image projected from the first projector 10A and the second display image projected from the second projector 10B can be superimposed. However, brightness of a region where the first display image and the second display image overlap is larger compared with other regions. Therefore, at the execution time of the calibration, for the purpose of uniformizing brightness of the regions in the screen area 110 including the region where the first display image and the second display image overlap, the computer 60 may calculate a blend map that specifies brightness for each of the pixels of the panels.

After the calibration ends, the computer 60 may supply a setting image different from the display image to the operation monitor 50 as an image of an operation GUI. In this case, the operation monitor 50 executes displaying the setting image, detecting operation for the setting image, acquiring a setting value concerning the display image based on the detected operation, and transmitting the setting value to the computer 60. The computer 60 generates the display image based on the setting value supplied from the operation monitor 50, the UVC video signal, and the all pixel correspondence map. Consequently, the user can adjust, for example, a tint of the display image displayed in the screen area 110 by operating the operation monitor 50. Therefore, convenience of the user is improved.

Configuration of the HDMI Capture 30

Figure 3:
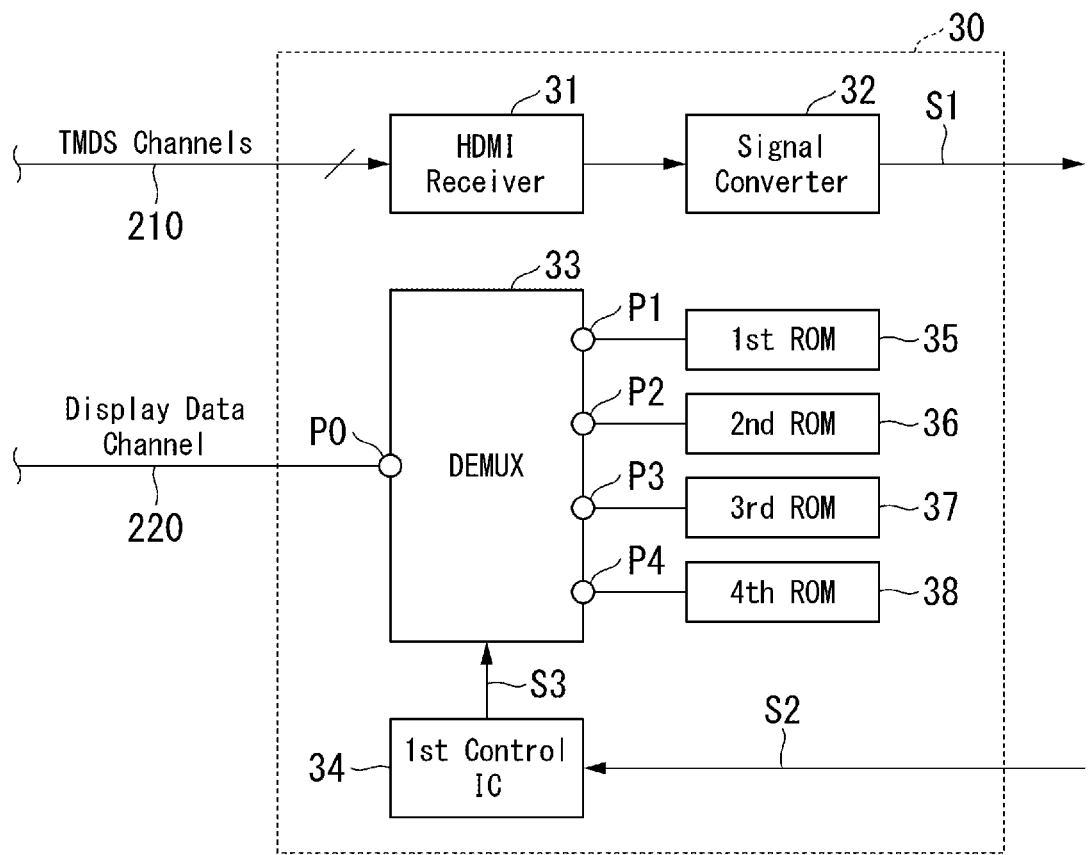
FIG. 3 is a block diagram showing a schematic configuration of an HDMI capture.

A configuration of the HDMI capture 30 is explained with reference to FIG. 3. FIG. 3 is a block diagram showing a schematic configuration of the HDMI capture 30. As shown in FIG. 3, the HDMI capture 30 includes an HDMI receiver 31, a signal converter 32, a demultiplexer 33, a first control IC (Integrated Circuit) 34, a first ROM (Read Only Memory) 35, a second ROM 36, a third ROM 37, and a fourth ROM 38.

An input terminal of the HDMI receiver 31 is connected to TMDS communication lines 210 included in the HDMI cable that connects the video supply device 20 and the HDMI capture 30. The HDMI receiver 31 receives an HDMI video signal from the video supply device 20 via the TMDS communication lines 210. The HDMI receiver 31 converts the HDMI video signal into a processable signal and outputs the processable signal to the signal converter 32.

An output terminal of the signal converter 32 is connected to a USB cable that connects the HDMI capture 30 and the computer 60. The signal converter 32 converts a signal input from the HDMI receiver 31 into a UVC video signal S1 and transmits the UVC video signal S1 to the computer 60 via the USB cable.

The demultiplexer 33 includes an input terminal P0, a first output terminal P1, a second output terminal P2, a third output terminal P3, and a fourth output terminal P4. The demultiplexer 33 electrically connects, based on a selection signal S3 input from the first control IC 34, any one of the first output terminal P1, the second output terminal P2, the third output terminal P3, and the fourth output terminal P4 and the input terminal P0.

The input terminal P0 is connected to a DDC communication line 220 included in the HDMI cable that connects the video supply device 20 and the HDMI capture 30. The first output terminal P1 is connected to the first ROM 35. The second output terminal P2 is connected to the second ROM 36. The third output terminal P3 is connected to the third ROM 37. The fourth output terminal P4 is connected to the fourth ROM 38.

The first ROM 35 stores first EDID indicating first resolution. The second ROM 36 stores second EDID indicating second resolution. The third ROM 37 stores third EDID indicating third resolution. The fourth ROM 38 stores fourth EDID indicating fourth resolution. For example, before the HDMI capture 30 is supplied to the market, the first EDID to the fourth EDID are respectively written in the first ROM 35 through the fourth ROM 38. A user who uses the HDMI capture 30 cannot rewrite contents of the first ROM 35 through the fourth ROM 38.

The first control IC 34 controls the demultiplexer 33 based on a first control signal S2 input from the outside. The first control IC 34 corresponds to "a first control device". For example, when the first control signal S2 instructs the HDMI capture 30 to transmit the first EDID, the first control IC 34 outputs, to the demultiplexer 33, the selection signal S3 for connecting the input terminal P0 to the first output terminal P1. In this case, the demultiplexer 33 electrically connects the input terminal P0 and the first output terminal P1. As a result, since the DDC communication line 220 and the first ROM 35 are electrically connected, the first EDID is transmitted from the HDMI capture 30 to the video supply device 20 via the DDC communication line 220.

For example, when the first control signal S2 instructs the HDMI capture 30 to transmit the second EDID, the first control IC 34 outputs, to the demultiplexer 33, the selection signal S3 for connecting the input terminal P0 to the second output terminal P2. In this case, the demultiplexer 33 electrically connects the input terminal P0 and the second output terminal P2. As a result, the DDC communication line 220 and the second ROM 36 are electrically connected. Therefore, the second EDID is transmitted from the HDMI capture 30 to the video supply device 20 via the DDC communication line 220.

For example, when the first control signal S2 instructs the HDMI capture 30 to transmit the third EDID, the first control IC 34 outputs, to the demultiplexer 33, the selection signal S3 for connecting the input terminal P0 to the third output terminal P3. In this case, the demultiplexer 33 electrically connects the input terminal P0 and the third output terminal P3. As a result, since the DDC communication line 220 and the third ROM 37 are electrically connected, the third EDID is transmitted from the HDMI capture 30 to the video supply device 20 via the DDC communication line 220.

For example, when the first control signal S2 instructs the HDMI capture 30 to transmit the fourth EDID, the first control IC 34 outputs, to the demultiplexer 33, the selection signal S3 for connecting the input terminal P0 to the fourth output terminal P4. In this case, the demultiplexer 33 electrically connects the input terminal P0 and the fourth output terminal P4. As a result, since the DDC communication line 220 and the fourth ROM 38 are electrically connected, the fourth EDID is transmitted from the HDMI capture 30 to the video supply device 20 via the DDC communication line 220.

The first ROM 35 corresponds to "a first storage device configured to store first image information indicating first resolution". The second ROM 36 corresponds to "a second storage device configured to store second image information indicating second resolution". That is, the demultiplexer 33 corresponds to "a switch configured to switch, between the first storage device and the second storage device, a connection destination of, among communication lines that connect the communication device and the video supply device, a first communication line through which the output image information is transmitted". In this embodiment, "among communication lines that connect the communication device and the video supply device, a first communication line through which the image information is transmitted" is, among communication lines included in the HDMI cable that connects the HDMI capture 30 and the video supply device 20, the DDC communication line 220 through which EDID is transmitted. Any piece of EDID transmitted from the HDMI capture 30 to the video supply device 20 is an example of the output image information.

The HDMI capture 30 may receive the first control signal S2 from the computer 60 or may receive the first control signal S2 from another external device. For example, the computer 60 transmits the first control signal S2 based on the resolution of the screen area 110 calculated by the calibration. Here, it is assumed that EDID indicating the resolution of the screen area 110 is the same as the first EDID. In this case, the computer 60 transmits, to the HDMI capture 30, the first control signal S2 for instructing the HDMI capture 30 to transmit the first EDID. As a result, as explained above, since the DDC communication line 220 and the first ROM 35 are electrically connected, the first EDID is transmitted from the HDMI capture 30 to the video supply device 20 via the DDC communication line 220. Consequently, the video supply device 20 can acquire EDID of the first projector 10A and the second projector 10B and can supply a video to the first projector 10A and the second projector 10B in an optimum video format.

When performing not-shown stack projection for causing the first projector 10A and the second projector 10B to project images such that the first projection region 100A and the second projection region 100B are superimposed, the computer 60 may transmit the first control signal S2 based on EDID set in any one of the projectors. For example, when being connected to the first projector 10A and the second projector 10B via the HDMI cable, the computer 60 receives EDID from each of the first projector 10A and the second projector 10B. When the first projector 10A and the second projector 10B are projectors with the same specifications, the same EDID is transmitted from each of the first projector 10A and the second projector 10B to the computer 60.

For example, it is assumed that the EDID transmitted from the first projector 10A and the second projector 10B to the computer 60 is the same as the first EDID. In this case, the computer 60 transmits, to the HDMI capture 30, the first control signal S2 for instructing the HDMI capture 30 to transmit the first EDID. As a result, as explained above, since the DDC communication line 220 and the first ROM 35 are electrically connected, the first EDID is transmitted from the HDMI capture 30 to the video supply device 20 via the DDC communication line 220. Consequently, the video supply device 20 can acquire the EDID of the first projector 10A and the second projector 10B and can supply a video to the first projector 10A and the second projector 10B in an optimum video format.

For example, when a third projector and a fourth projector with specifications different from the specifications of the first projector 10A and the second projector 10B are connected to the computer 60 via the HDMI cable, the computer 60 receives EDID from the third projector and the fourth projector.

For example, it is assumed that the EDID transmitted from the third projector and the fourth projector to the computer 60 is the same as the second EDID. In this case, the computer 60 transmits, to the HDMI capture 30, the first control signal S2 for instructing the HDMI capture 30 to transmit the second EDID. As a result, as explained above, since the DDC communication line 220 and the second ROM 36 are electrically connected, the second EDID is transmitted from the HDMI capture 30 to the video supply device 20 via the DDC communication line 220. Consequently, the video supply device 20 can acquire the EDID of the third projector and the fourth projector and can supply a video to the third projector and the fourth projector in an optimum video format.

As explained above, the HDMI capture 30 in this embodiment retains a different plurality of pieces of EDID in advance and transmits any one of the different plurality of pieces of EDID to the video supply device 20 according to the first control signal S2 input from the outside. This makes it unnecessary to use an EDID emulator that provides EDID to the video supply device 20. Therefore, it is possible to realize simplification of a system configuration and a reduction in system cost. Since the HDMI capture 30 retains the different plurality of pieces of EDID in advance, it is possible to provide the projection system 1 adaptable to projectors with various specifications without using the EDID emulator.

Note that, for example, a configuration may be adopted in which an EDID selection switch configured by a rotary switch, a dip switch, or the like is provided in a housing of the HDMI capture 30 and, when the user operates the EDID selection switch, a selection signal is output from the EDID selection switch to the demultiplexer 33.

For example, when the user operates the EDID selection switch to thereby select the first EDID, a selection signal for connecting the input terminal P0 to the first output terminal P1 is output from the EDID selection switch to the demultiplexer 33. As a result, since the DDC communication line 220 and the first ROM 35 are electrically connected, the first EDID is transmitted from the HDMI capture 30 to the video supply device 20 via the DDC communication line 220.

When the EDID selection switch is provided in the HDMI capture 30 as explained above, the user can select any piece of EDID out of the plurality of pieces of EDID retained by the HDMI capture 30. Therefore, the convenience of the user is improved.

Note that, when the EDID selection switch is provided, since the first control IC 34 is unnecessary, the first control IC 34 may be deleted from the HDMI capture 30. However, the EDID selection switch and the first control IC 34 may be concurrently used. When the EDID selection switch and the first control IC 34 are concurrently used, a configuration may be adopted in which a mode changeover switch is provided in the housing of the HDMI capture 30 and, when the user operates the mode changeover switch, one of the selection signal output from the EDID selection switch and the selection signal S3 output from the first control IC 34 is input to the demultiplexer 33.

For example, when the user selects a first mode by operating the mode changeover switch, the selection signal output from the EDID selection switch is input to the demultiplexer 33. On the other hand, when the user selects a second mode by operating the mode changeover switch, the selection signal S3 output from the first control circuit 34 is input to the demultiplexer 33.

When a configuration is adopted in which the EDID selection switch and the first control IC 34 are concurrently used as explained above, the user can switch, according to a situation, the first mode for manually selecting any piece of EDID out of the plurality of pieces of EDID retained by the HDMI capture 30 and a second mode for automatically selecting, with the computer 60, an optimum piece of EDID from the plurality of pieces of EDID. Therefore, the convenience of the user is improved.

Effects of this Embodiment

As explained above, the projection system 1 in this embodiment includes the two projectors 10A and 10B that display a display image, the computer 60 that supplies, to the projectors 10A and 10B, information indicating a display image generated based on a UVC video signal conforming to the USB standard, that is, a first output video signal and a second output video signal, and the HDMI capture 30 that executes transmitting, to the video supply device 20 on the outside, EDID indicating resolution of the screen area 110 where the projectors 10A and 10B display the display image, receiving, from the video supply device 20, an HDMI video signal conforming to the HDMI standard different from the USB standard, and converting the HDMI video signal into a UVC video signal and transmitting the UVC video signal to the computer 60.

As explained above, the projection system 1 in this embodiment adopts a configuration in which the HDMI capture 30 and the computer 60 are disposed as repeaters between the video supply device 20 and the plurality of projectors 10A and 10B and EDID is transmitted from the HDMI capture 30 to the video supply device 20. This makes it unnecessary to use the EDID emulator that provides EDID to the video supply device 20. Therefore, it is possible to realize simplification of a system configuration and a reduction in system cost.

In the projection system 1 in this embodiment, the HDMI capture 30 includes the first ROM 35 that stores the first EDID indicating the first resolution, the second ROM 36 that stores the second EDID indicating the second resolution, and the demultiplexer 33 that switches, between the first ROM 35 and the second ROM 36, a connection destination of, among the communication lines that connect the HDMI capture 30 and the video supply device 20, the DDC communication line 220 through which EDID is transmitted.

As explained above, the HDMI capture 30 in this embodiment adopts a configuration in which a plurality of pieces of EDID are retained in advance by a plurality of ROMs and any one of a different plurality of pieces of EDID is transmitted to the video supply device 20 via the DDC communication line 220. By using, as a repeater, the HDMI capture 30 including such a configuration, it is possible to provide the projection system 1 adaptable to projectors with various specifications without using the EDID emulator.

In the projection system 1 in this embodiment, the HDMI capture 30 further includes the first control IC 34 that controls the demultiplexer 33 based on the first control signal S2 input from the outside.

With the HDMI capture 30 including the configuration explained above, even if the user does not perform specific operation, any one of the different plurality of pieces of EDID is transmitted to the video supply device 20 according to the first control signal S2 input from the outside. Therefore, the convenience of the user is improved.

The projection system 1 in this embodiment includes the camera 40 that captures a plurality of display images projected from the two projectors 10A and 10B included in the plurality of display devices. The camera 40 transmits, to the computer 60, a captured image obtained by capturing the plurality of display images. The computer 60 acquires, based on the captured image, EDID indicating resolution of the screen area 110 where the two projectors 10A and 10B display a display image.

With the projection system 1 including the configuration explained above, the EDID indicating the resolution of the screen area 110 can be acquired based on the captured image obtained from the camera 40. Therefore, it is also possible to cope with a case in which a plurality of projectors are used as the display devices.

The projection system 1 in this embodiment further includes the operation monitor 50 that communicates with the computer 60 and is different from the two projectors 10A and 10B. The computer 60 supplies a setting image different from the display image to the operation monitor 50. The operation monitor 50 executes displaying the setting image, detecting operation for the setting image, acquiring a setting value concerning the display image based on the detected operation, and transmitting the setting value to the computer 60. The computer 60 generates the display image based on the setting value.

With the projection system 1 including the configuration explained above, by operating the operation monitor 50, the user can adjust, for example, a tint of a display image displayed in the screen area 110. Therefore, the convenience of the user is improved.

In the projection system 1 in this embodiment, the first communication standard is the USB, the second communication standard is the HDMI, and the output image information is the EDID.

Consequently, the EDID can be used as the output image information. Therefore, the video supply device 20 and the HDMI capture 30 can perform communication of various data by performing HDMI communication.

A display method in this embodiment includes the HDMI capture 30 transmitting, to the video supply device 20, EDID indicating resolution of the screen area 110 in which the two projectors 10A and 10B display a display image, the HDMI capture 30 receiving, from the video supply device 20, an HDMI video signal conforming to the HDMI standard, the HDMI capture 30 converting the HDMI video signal into a UVC video signal conforming to the USB standard different from the HDMI standard and transmitting the UVC video signal to the computer 60, the computer 60 supplying, to the two projectors 10A and 10B, information indicating a display image based on the UVC video signal, that is, a first output video signal and a second output video signal, and the two projectors 10A and 10B displaying the display image in the screen area 110.

With the display method in this embodiment, EDID is transmitted from the HDMI capture 30, which is disposed between the video supply device 20 and the plurality of projectors 10A and 10B, to the video supply device 20 without using an EDID emulator. Therefore, it is possible to simplify a process until the display image is displayed on the screen 110.

The embodiment of the present disclosure is explained above. However, the technical scope of the present disclosure is not limited to the embodiment. Various changes can be added without departing from the gist of the present disclosure.

For example, in the embodiment, the projection system 1 including the two projectors 10A and 10B as the display devices is illustrated. However, the present disclosure is not limited to this. The number of projectors only has to be one or more. The display devices are not limited to the projectors and may be other display devices such as a liquid crystal display and an organic EL (Electro Luminescence) display.

For example, in the embodiment, the configuration in which the first projector 10A and the second projector 10B are respectively connected to the computer 60 via the communication cables of the HDMI cables and the configuration in which the first projector 10A and the second projector 10B perform communication by wireless communication are illustrated. However, the present disclosure is not limited to this. The first projector 10A and the second projector 10B may perform communication according to a standard such as a VGA (Video Graphics Array), an LAN (Local Area Network), a USB, or RS-232C.

For example, in the embodiment, the configuration is illustrated in which the HDMI capture 30, which is an example of the communication device, receives an HDMI video signal from the video supply device 20. However, a video signal received by the communication device is not limited to the HDMI video signal. For example, the communication device may receive a VGA video signal from the video supply device 20 via a communication cable of a VGA cable. The communication device may be connected to the video supply device 20 by wireless communication and receive a video signal suitable for the wireless communication. In this case, transmission of output image information is not limited to the transmission of the EDID via the HDMI cable. The output image information may be transmitted by communication conforming to a standard such as the LAN, the USB, or the RS-232C.

For example, the HDMI capture 30 explained above in the embodiment retains the different plurality of pieces of EDID in advance and transmits any one of the different plurality of pieces of EDID to the video supply device 20 according to the first control signal S2 input from the outside. A configuration of the HDMI capture 30 is not limited to this. A modification of the HDMI capture 30 is explained below with reference to FIG. 4.

Figure 4:
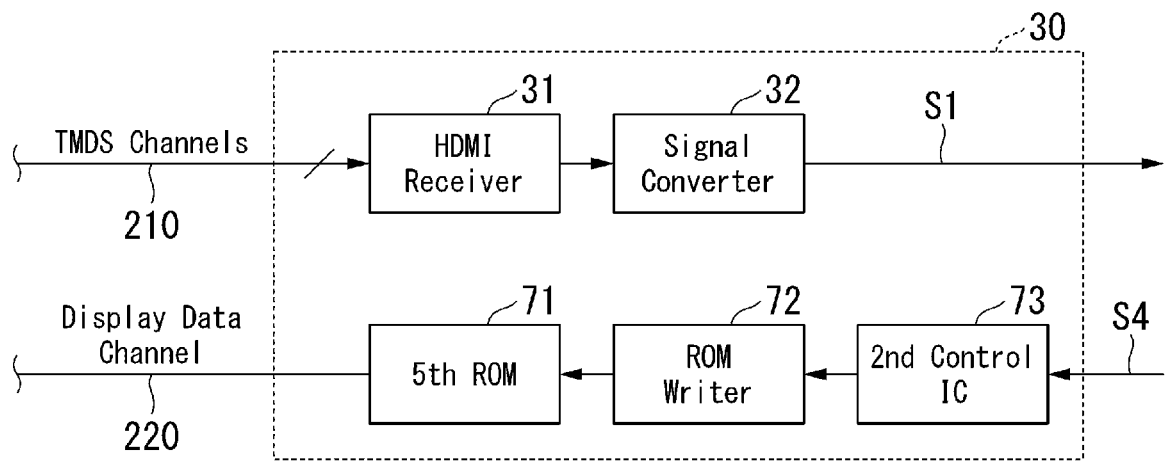
FIG. 4 is a block diagram showing a modification of the HDMI capture.

FIG. 4 is a block diagram showing a schematic configuration of the HDMI capture 30 in the modification. Among components shown in FIG. 4, the same components as the components shown in FIG. 3 are denoted by the same reference numerals and signs as the reference numerals and signs in FIG. 3. Explanation of the components is omitted below. As shown in FIG. 4, the HDMI capture 30 in the modification includes the HDMI receiver 31, the signal converter 32, a fifth ROM 71, a ROM writer 72, and a second control IC 73.

The fifth ROM 71 is connected to, among the communication lines included in the HDMI cable that connects the HDMI capture 30 and the video supply device 20, the DDC communication line 220 through which EDID is transmitted. The fifth ROM 71 corresponds to "a third storage device".

The ROM writer 72 is a writing device that writes information in the fifth ROM 71 according to an instruction of the second control IC 73. The second control IC 73 controls the ROM writer 72 based on a second control signal S4 input from the outside. Specifically, the second control IC 73 instructs the ROM writer 72 to write, in the fifth ROM 71, EDID indicating resolution instructed by the second control signal S4. The second control IC 73 corresponds to "a second control device". The EDID indicating the resolution instructed by the second control signal S4 corresponds to "third image information indicating third resolution instructed by the second control signal".

In the modification as well, the HDMI capture 30 may receive the second control signal S4 from the computer 60 or may receive the second control signal S4 from another external device. For example, by operating the operation monitor 50, the user can instruct the computer 60 to output the second control signal S4 for writing desired EDID in the fifth ROM 71.

When detecting that that the instruction is received from the user based on an operation signal input from the operation monitor 50, the computer 60 outputs, the second control signal S4 for writing EDID designated by the user in the fifth ROM 71. As a result, the EDID designated by the user is written in the fifth ROM 71. The EDID written in the fifth ROM 71 is transmitted to the video supply device 20 via the DDC communication line 220.

As explained above, with the HDMI capture 30 in the modification, EDID stored in the fifth ROM 71 can be rewritten. Therefore, it is possible to provide the projection system 1 adaptable to projections with various specifications without using the EDID emulator.

SUMMARY OF THE PRESENT DISCLOSURE

A summary of the present disclosure is noted below.

Note 1

A display system including: a plurality of display devices configured to display a display image; a computer configured to supply, to the plurality of display devices, information indicating the display image generated based on a first video signal conforming to a first communication standard; and a communication device configured to execute: transmitting, to a video supply device on an outside, output image information indicating resolution of a display region where the plurality of display devices display the display image; receiving, from the video supply device, a second video signal conforming to a second communication standard different from the first communication standard; and converting the second video signal into the first video signal and transmitting the first video signal to the computer.

With the display system described in Note 1, a configuration is adopted in which the communication device and the computer are disposed between the video supply device and the plurality of display devices as repeaters and the output image information is transmitted from the communication device to the video supply device. This makes it unnecessary to use a dedicated device that provides the output image information to the video supply device. Therefore, it is possible to realize simplification of a system configuration and a reduction in system cost.

Note 2

The display system described in Note 1, wherein the communication device includes: a first storage device configured to store first image information indicating first resolution; a second storage device configured to store second image information indicating second resolution; and a switch configured to switch, between the first storage device and the second storage device, a connection destination of, among communication lines that connect the communication device and the video supply device, a first communication line through which the output image information is transmitted.

In the display system described in Note 2, the communication device adopts a configuration in which a different plurality of pieces of image information are retained in advance by a plurality of storage devices and any one of the different plurality of pieces of image information is transmitted to the video supply device via the first communication line by the switch. By using, as a repeater, the communication device including such a configuration, it is possible to provide a display system adaptable to display devices with various specifications without using a dedicated device that provides output image information to the video supply device.

Note 3

The display system described in Note 2, wherein the communication device further includes a first control device configured to control the switch based on a first control signal input from the outside.

With the communication device included in the display system described in Note 3, even if the user does not perform specific operation, any one of the different plurality of pieces of image information is transmitted to the video supply device according to the first control signal input from the outside. Therefore, convenience of the user is improved.

Note 4

The display system described in Note 1, wherein the communication device includes: a third storage device connected to, among communication lines that connect the communication device and the video supply device, a first communication line through which the output image information is transmitted; a writing device configured to write information in the third storage device; and a second control device configured to control the writing device based on a second control signal input from the outside, and the second control device instructs the writing device to write, in the third storage device, third image information indicating third resolution instructed by the second control signal.

With the display system described in Note 4, image information stored in the third storage device can be rewritten. Therefore, it is possible to provide a display system adaptable to display devices with various specifications without using a dedicated device that provides output image information to the video supply device.

Note 5

The display system according to any one of Notes 1 to 4, further including one or more cameras configured to capture a plurality of display images projected from a plurality of projectors included in the plurality of display devices, wherein the one or more cameras transmit, to the computer, one or more captured images obtained by capturing the plurality of display images, and the computer acquires, based on the one or more captured images, the output image information indicating resolution of a display region where the plurality of projectors display the display images.

With the display system described in Note 5, the output image information indicating the resolution of the display region can be acquired based on the captured images obtained from the cameras. Therefore it is possible to cope with a case in which a plurality of projectors are used as the display devices.

Note 6

The display system described in any one of Notes 1 to 5, further including an operation monitor configured to communicate with the computer and different from the plurality of display devices, wherein the computer supplies a setting image different from the display image to the operation monitor, the operation monitor executes: displaying the setting image; detecting operation for the setting image; acquiring a setting value concerning the display image based on the detected operation; and transmitting the setting value to the computer, and the computer generates the display image based on the setting value.

With the display system described in Note 6, by operating the operation monitor, the user can adjust, for example, a tint of a display image displayed in the display region. Therefore, the convenience of the user is improved.

Note 7

The display system described in any one of Notes 1 to 6, wherein the first communication standard is a USB (Universal Serial Bus), the second communication standard is an HDMI (High-Definition Multimedia Interface: registered trademark), and the output image information is EDID (Extended Display Identification Data).

With the display system described in Note 7, the EDID can be used as the output image information. Therefore, the video supply device and the communication device can perform communication of various data by performing HDMI communication.

Note 8

A display method including: a communication device transmitting, to a video supply device, image information indicating resolution of a display region where a plurality of display devices display a display image; the communication device receiving a second video signal conforming to a second communication standard from the video supply device; and the communication device converting the second video signal into a first video signal conforming to a first communication standard different from the second communication standard and transmitting the first video signal to a computer; the computer supplying information indicating the display image based on the first video signal to the plurality of display devices; and the plurality of display devices displaying the display image in the display region.

With the display method described in Note 8, the output image information is transmitted from the communication device disposed between the video supply device and the plurality of display devices to the video supply device without using a dedicated device that provides the output image information to the video supply device. Therefore, it is possible to simplify a process until the display image is displayed in the display region.

What is claimed is:

1. A display system comprising:
    a plurality of display devices configured to display a display image;
    a computer configured to supply, to the plurality of display devices, information indicating the display image generated based on a first video signal conforming to a first communication standard; and
    a communication device configured to execute:
        transmitting, to a video supply device on an outside, output image information indicating resolution of a display region where the plurality of display devices display the display image;
        receiving, from the video supply device, a second video signal conforming to a second communication standard different from the first communication standard; and
        converting the second video signal into the first video signal and transmitting the first video signal to the computer.

2. The display system according to claim 1, wherein the communication device includes:
    a first storage device configured to store first image information indicating first resolution;
    a second storage device configured to store second image information indicating second resolution; and
    a switch configured to switch, between the first storage device and the second storage device, a connection destination of, among communication lines that connect the communication device and the video supply device, a first communication line through which the output image information is transmitted.

3. The display system according to claim 2, wherein the communication device further includes a first control device configured to control the switch based on a first control signal input from the outside.

4. The display system according to claim 1, wherein the communication device includes:
    a third storage device connected to, among communication lines that connect the communication device and the video supply device, a first communication line through which the output image information is transmitted;
    a writing device configured to write information in the third storage device; and
    a second control device configured to control the writing device based on a second control signal input from the outside, and
    the second control device instructs the writing device to write, in the third storage device, third image information indicating third resolution instructed by the second control signal.

5. The display system according to claim 1, further comprising one or more cameras configured to capture a plurality of display images projected from a plurality of projectors included in the plurality of display devices, wherein
    the one or more cameras transmit, to the computer, one or more captured images obtained by capturing the plurality of display images, and
    the computer acquires, based on the one or more captured images, the output image information indicating resolution of a display region where the plurality of projectors display the display images.

6. The display system according to claim 1, further comprising an operation monitor configured to communicate with the computer and different from the plurality of display devices, wherein
    the computer supplies a setting image different from the display image to the operation monitor,
    the operation monitor executes:
        displaying the setting image;
        detecting operation for the setting image;
        acquiring a setting value concerning the display image based on the detected operation; and
        transmitting the setting value to the computer, and
    the computer generates the display image based on the setting value.

7. The display system according to claim 1, wherein
the first communication standard is a USB (Universal Serial Bus),
the second communication standard is an HDMI (High-Definition Multimedia Interface: registered trademark), and
the output image information is EDID (Extended Display Identification Data).

8. A display method comprising:
a communication device transmitting, to a video supply device, output image information indicating resolution of a display region where a plurality of display devices display a display image;
the communication device receiving a second video signal conforming to a second communication standard from the video supply device; and
the communication device converting the second video signal into a first video signal conforming to a first communication standard different from the second communication standard and transmitting the first video signal to a computer;
the computer supplying information indicating the display image based on the first video signal to the plurality of display devices; and
the plurality of display devices displaying the display image in the display region.

* * * * *